No. 657,877. Patented Sept. 11, 1900.
H. E. KIRBY.
PROCESS OF CURING AND SMOKING FISH.
(Application filed Jan. 23, 1900.)
(No Model.)
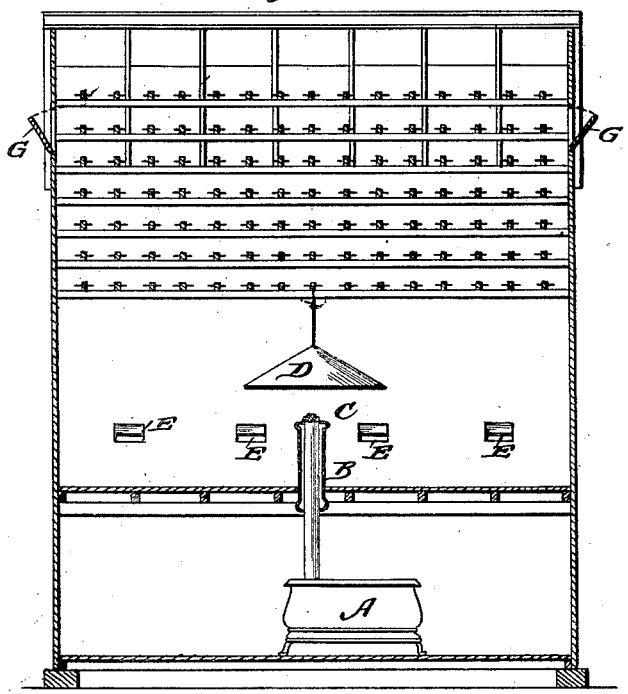
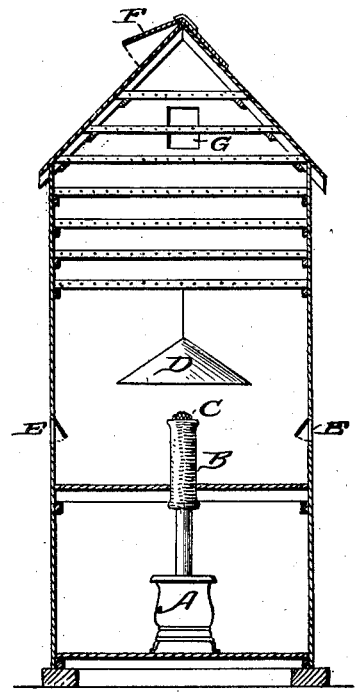
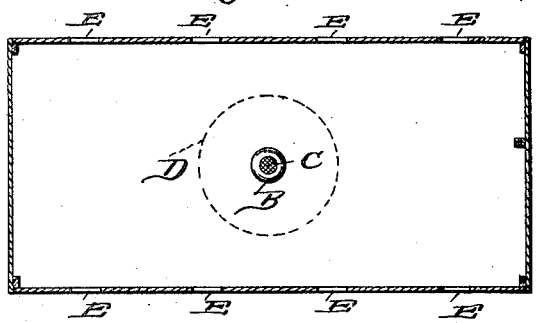
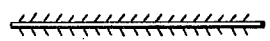
WITNESSES:
M. S. Bloudel
Amos W. Hart
INVENTOR
Horace E. Kirby.
BY Munn & Co.
ATTORNEYS

UNITED STATES PATENT OFFICE.

HORACE EBENEZER KIRBY, OF ROCK BAY, CANADA, ASSIGNOR TO FRANK CASPAR DAVIDGE, OF VICTORIA, CANADA.

PROCESS OF CURING AND SMOKING FISH.

SPECIFICATION forming part of Letters Patent No. 657,877, dated September 11, 1900.

Application filed January 23, 1900. Serial No. 2,522. (No specimens.)

*To all whom it may concern:*

Be it known that I, HORACE EBENEZER KIRBY, a subject of the Queen of Great Britain, residing at Rock Bay, Skeena river, in the Province of British Columbia and Dominion of Canada, have invented a certain new and useful Process of Smoking Fish, of which the following is a specification.

The object of this invention is by an entirely different and a much cheaper process than any one in use hitherto to smoke all kinds of fish in a new way, which fish when so smoked will have the finnan-haddock flavor and when canned will keep for an indefinite period.

In the accompanying drawings, Figure 1 is a plan view of one of the sticks upon which the fish are suspended. Fig. 2 is a vertical longitudinal section of a smoke-house. Fig. 3 is a vertical cross-section of the smoke-house. Fig. 4 is a horizontal section of the smoke-house.

The mode of practicing my invention is as follows: The fish after being carefully cleaned are cut into cutlets and cured with sugar and salt (without any water being added thereto) and then thoroughly washed and allowed to drain. The cutlets are then hung on nails driven into long sticks, (see Fig. 1,) and these sticks are then hung up in the smoke-house, which is an ordinary building made of rough lumber and tightly battened up. (See Fig. 2.) Fig. 3 shows an end view of the building.

F is a ventilator which works on hinges and runs the length of the roof and when opened soon clears the smoke-house of smoke.

G is a window which is used to watch the fish while being smoked.

Fig. 2 shows that the smoke-house is built off the ground, and in the room below, which is about five or six feet high, is a stove A, the stovepipe from which goes up through the center of the floor of the smoke-house. The pipe does not enter the smoke-house, but runs into a terra-cotta pipe B, which is capped with a wire cap C. The terra-cotta pipe is only used because it does not emit heat, as an ordinary stovepipe does, and the cap is used to purify the smoke. Immediately above the wire cap is a round cone-shaped smoke-distributer D. A fire made of any kind of wood found in British Columbia, either hard or soft, (except yellow cedar or pitch-pine,) is made in this stove. When a good fire has been made, for every ton of fish to be smoked one gallon of coal-tar is added, and the smoke produced from the wood and the coal-tar goes through the terra-cotta pipe and is purified by the wire cap and then strikes the smoke-distributer, and is thus spread evenly all over the smoke-house. There are ventilators all around the base of the smoke-house E E E E, (see Figs. 2 and 4,) and the smoke having some distance to go and being thrown by the smoke-distributer to the walls, and thus mixing with the cold air which comes through the ventilators, is cooled off before it reaches the fish. Besides this, in all other processes the stove producing the smoke has been in the smoke-house, and thus kept the room very warm. The fish is smoked for eighteen hours. Fish so smoked has the finnan-haddock flavor and when canned will keep for an indefinite period.

I am aware that certain processes of smoking fish have been used hitherto; but in such processes the fire producing the smoke has been in the smoke-house, thus heating the smoke-house and smoking the fish with hot smoke, and, moreover, there being no smoke-distributer, the fish would not be evenly smoked. In my process the smoke is cooled off before it reaches the fish, and in this way my invention is new. Also in all other processes it has been absolutely essential to use hard wood, while in my process any kind of wood found in British Columbia (except pitch-pine and yellow cedar) can be used, and in this respect my invention is new and the process is cheaper. So far as I know, coal-tar has never been used before in smoking fish. The coal-tar has a peculiarly-penetrating effect and reaches every part of the fish.

What I claim, and desire to secure by Letters Patent of the United States, is—

The process of smoking fish with cool smoke produced from a wood-fire and coal-tar, substantially in the proportions mentioned for the purposes set forth.

Victoria, British Columbia, Canada, January 16, 1900.

HORACE EBENEZER KIRBY.

In presence of—
ALBERT JAMES MACDONALD,
MONT BRUCE ROBERTSON.